No. 784,279.

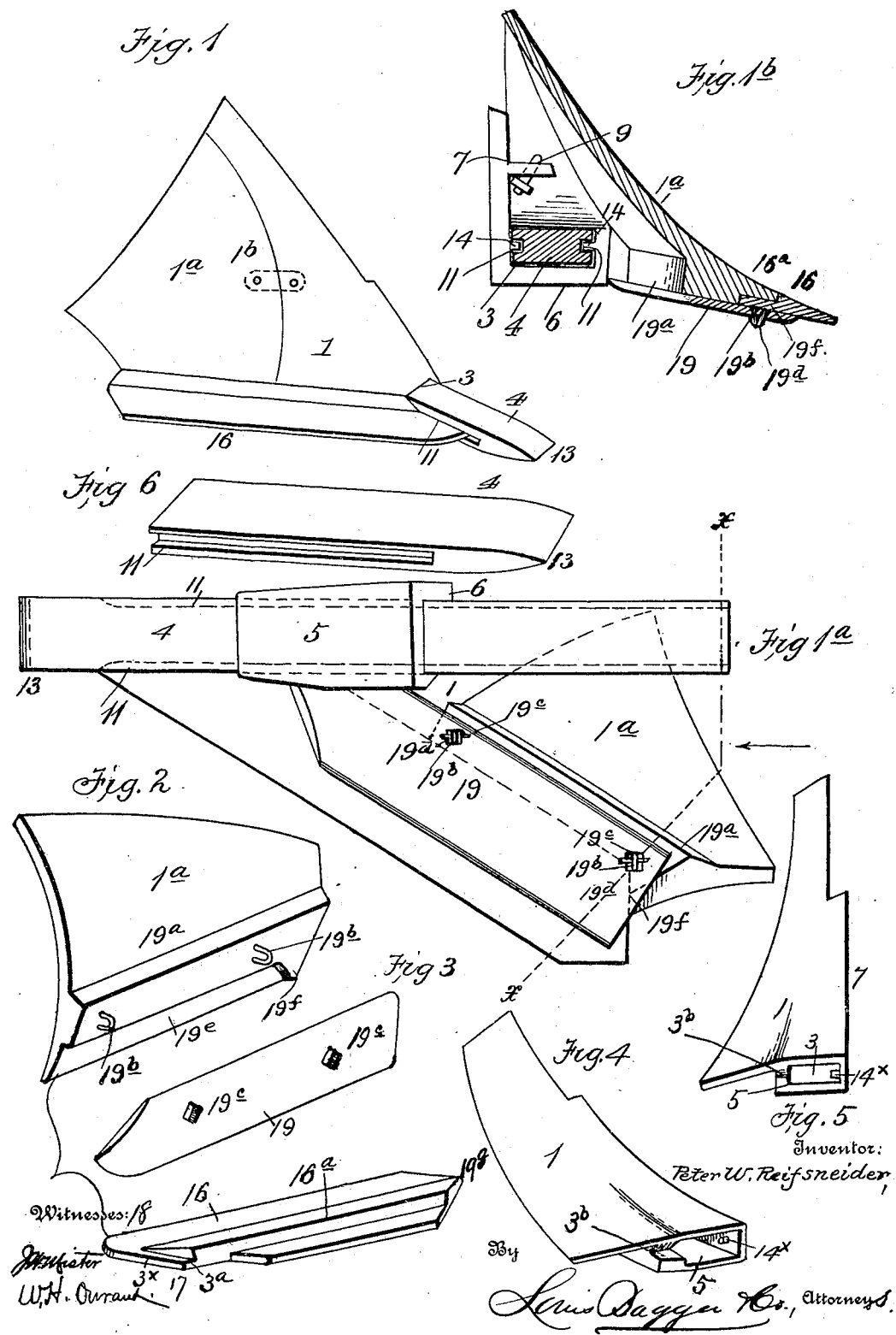

Patented March 7, 1905.

UNITED STATES PATENT OFFICE.

PETER W. REIFSNEIDER, OF LIMERICK TOWNSHIP, MONTGOMERY COUNTY, PENNSYLVANIA.

PLOW.

SPECIFICATION forming part of Letters Patent No. 784,279, dated March 7, 1905.

Application filed August 5, 1903. Serial No. 168,349.

*To all whom it may concern:*

Be it known that I, PETER W. REIFSNEIDER, a citizen of the United States, residing in Limerick township, in the county of Montgomery and State of Pennsylvania, have invented certain new and useful Improvements in Plows, of which the following is a specification.

My invention relates to improvements in plows; and it has for its object to render the point readily detachable and adjustable; and it consists of the combination and arrangement of parts, including their construction, substantially as hereinafter more fully disclosed, and specifically pointed out by the claims.

In the accompanying drawings, illustrating the preferred embodiment of my invention, Figure 1 is a perspective view of the same. Fig. 1$^a$ is an inverted or bottom view thereof. Fig. 1$^b$ is a transverse section taken on the line $x$ $x$ of Fig. 1$^a$. Fig. 2 is a detail perspective view of the moldboard-wing and the share. Fig. 3 is a similar view of the lapping or splicing plate effecting connection between the share, moldboard, and moldboard-wing. Fig. 4 is a detail perspective view of the moldboard, disclosing more especially the forward lateral edge notch therein to accommodate the converging edge of the share, whose forward edge engages one of two lateral grooves in the plow-point adjacently to said notch. Fig. 5 is a forward end or front elevation of the moldboard. Fig. 6 is a detached perspective view of the chisel-pointed bar forming the plow-point.

In the carrying out of my invention I provide a moldboard 1, having integral or cast therewith upon its under side a socket or housing 5, laterally forming in part the landside, said moldboard having a separate wing or extension 1$^a$ dished upon its outer or front surface rearward and suitably connected or coupled to said moldboard, the connection, as indicated in dotted lines at 1$^b$ in Fig. 1, being effected upon the under side of said moldboard and wing or extension. A preferably chisel-pointed bar 4 has lateral longitudinal grooves 11, into one of which extends a lug 14$^\times$ upon the inner surface of the housing 5 and which bar is inserted through the aperture 3 of said housing 5. The pointed or tapered end of said bar 4 projects a suitable distance beyond the forward end of the moldboard to form or constitute the plow-point, as at 13, while the opposite end of said bar extends some distance rearward from said moldboard and is suitably held in such position by a bracket 6, as seen in Fig. 1$^b$, integral or cast with the moldboard. Said bracket, like the part 5, takes under or receives said plow-point bar 4 and has lugs or projections 14 engaging the grooves 11 of said bar—as, for instance, in the initial use of said bar and when reversed after the wearing of the point for further use in reversed position—said bracket also having an arm 7 arranged higher, having an aperture receiving a bolt 9, suitably secured therein by a nut and inserted through an aperture in the moldboard 1, to which it is held by heading the same for bracing said bracket.

A share 16, deflected or standing outward and downward at the required angle from the plow-point bar and moldboard, has its forward end 17 and 18 accordingly adapted to engage said bar at the forward end of one of the grooves 11 of said bar, it being notched in approximately V-shaped form, as at 3$^a$, and a narrow margin 3$^\times$ left beyond the notch 3$^a$. Said forward end of share is also stepped at that end, as seen in Fig. 2, to engage laterally the socket 5, while the upper surface of said share has a longitudinal shoulder or upraised portion 16$^a$, adapted to engage or abut the lower edges of said moldboard and its wing 1$^a$, as seen in Fig. 1, to prevent inward lateral displacement of said share, the outer surface of said shoulder itself sloping in continuation of the corresponding surface or declination of said moldboard and wing. The forward lateral edge of the socket or housing 5 is obliquely notched in angular V-shaped form, as at 3$^b$, as shown in Fig. 4, in correspondence with the outstanding angular disposition of the share 16 to conform to and effect the requisite fitting together of said parts at that point.

Overlying or covering the joint or meeting edges of the moldboard-wing 1$^a$ and the share 16 upon the under side is a plate 19, secured upon a longitudinal thickened portion or enlargement $19^a$ upon said side or surface of said moldboard-wing by suitable means, as by staples $19^b$, projecting from said thickened portion $19^a$ through apertures or holes $19^c$ in said plate 19, and keys or wedges $19^d$ inserted through the projecting portions of said staples. The outer surface of the thickened portion or enlargement $19^a$ of the moldboard-wing $1^a$ is inclined, as seen in Figs. $1^b$ and 2, with said surface arranged flush with the corresponding surface of the share 16, thus providing for securing a clamping action of the lower longitudinal edge of the binding or clamping plate 19 upon said share, thereby effecting the retention of the latter firmly in position. Said thickened portion or enlargement $19^a$ is reduced a suitable distance from the bottom longitudinal edge of the moldboard-wing, as at $19^e$, said reduction extending from a rear edge inclined shoulder $19^f$ on the moldboard, forming a stop for the corresponding edge of a flange $16^b$ of the share 16 and over which share and shoulder lies the clamping-bar 19, secured in place as above described.

To adjust the angle of the chisel-pointed bar forming the plow-point 4, it is only required to properly manipulate the nut of the bolt 9.

It will be understood that latitude is allowed herein as to details, as they may be changed as circumstances suggest without departing from the spirit of my invention and said invention still be protected.

What I claim is—

1. A plow having a plow-point bar provided with lateral longitudinal grooves, a moldboard provided upon the under side, at its forward end, with a housing receiving said bar, and a bracket integral with said moldboard and having a lug engaging either of said grooves, said bracket being braced in position from said moldboard.

2. A plow having a moldboard, with its wing, a share applied to said moldboard, said wing having an inclined underneath thickened portion provided with a longitudinal recess, said wing having staples projecting therefrom, and a clamping-plate engaging said inclined thickened portion and having apertures receiving said staples and keys inserted into said staples, outside of said plate.

3. A plow embracing a moldboard with its wing, said wing having an inclined underneath thickened portion provided with a longitudinal recess, said moldboard having a housing upon the under side, at the forward end, a plow-point bar carried at its forward end by said housing and having lateral longitudinal grooves, a rear end-supporting bracket for said plow-point bar, having a lateral lug engaging either of the grooves of said bar, a share having upon its upper surface a longitudinal shoulder engaging the bottom edges of said moldboard and wing, said share also having a stepped and notched oblique lateral edge opposed to said plow-point bar and moldboard, said housing also having a lateral angular notch at its forward edge receiving the corresponding edge of said share, and a clamping-plate secured to, and resting upon, the underneath inclined surface of said moldboard-wing and bearing upon said share, said share having its rear end portion let into the recess of said wing.

In testimony whereof I have hereunto set my hand in presence of two subscribing witnesses.

PETER W. REIFSNEIDER.

Witnesses:
 EVA F. SHOMO,
 HARVEY L. SHOMO.